US008990551B2

(12) United States Patent
Shafi

(10) Patent No.: US 8,990,551 B2
(45) Date of Patent: Mar. 24, 2015

(54) ANALYSIS AND VISUALIZATION OF CLUSTER RESOURCE UTILIZATION

(75) Inventor: Hazim Shafi, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 868 days.

(21) Appl. No.: 12/883,859

(22) Filed: Sep. 16, 2010

(65) Prior Publication Data

US 2012/0072758 A1 Mar. 22, 2012

(51) Int. Cl.
G06F 1/24 (2006.01)
G06F 9/00 (2006.01)
G06F 9/50 (2006.01)
G06F 11/32 (2006.01)
G06F 11/36 (2006.01)
G06F 11/34 (2006.01)

(52) U.S. Cl.
CPC ............ *G06F 9/5011* (2013.01); *G06F 11/323* (2013.01); *G06F 11/3612* (2013.01); *G06F 11/3404* (2013.01); *G06F 2209/508* (2013.01)
USPC ........................................................ 713/100

(58) Field of Classification Search
USPC .......................................... 713/100; 718/100
See application file for complete search history.

(56) References Cited

U.S. PATENT DOCUMENTS

| 5,168,554 | A | 12/1992 | Luke |
| 5,297,274 | A | 3/1994 | Jackson |
| 5,903,730 | A | 5/1999 | Asai et al. |
| 6,057,839 | A | 5/2000 | Advani et al. |
| 6,226,787 | B1 | 5/2001 | Serra et al. |
| 6,289,369 | B1 | 9/2001 | Sundaresan |
| 6,332,212 | B1 | 12/2001 | Organ et al. |
| 6,341,347 | B1 | 1/2002 | Joy et al. |
| 7,137,120 | B2 | 11/2006 | Armstrong et al. |
| 7,343,476 | B2 | 3/2008 | Floyd et al. |
| 7,353,370 | B2 | 4/2008 | Rodgers et al. |
| 7,426,731 | B2 | 9/2008 | Findeisen |
| 7,610,186 | B2 | 10/2009 | Odhner et al. |
| 8,418,148 | B2 | 4/2013 | Shafi et al. |
| 2002/0152305 | A1 | 10/2002 | Jackson et al. |
| 2003/0187929 | A1* | 10/2003 | Pugh et al. .................... 709/205 |
| 2004/0210900 | A1 | 10/2004 | Jones et al. |
| 2005/0104799 | A1 | 5/2005 | Shimizu |
| 2006/0095917 | A1 | 5/2006 | Black-Ziegelbein et al. |

(Continued)

OTHER PUBLICATIONS

Hazim Shafi, "Visual Studio 2010 Beta 1: Parallel Performance Tools Overview", May 18, 2009.*

(Continued)

*Primary Examiner* — Jaweed A Abbaszadeh
*Assistant Examiner* — Xuxing Chen
(74) *Attorney, Agent, or Firm* — Kevin Sullivan; Leonard Smith; Micky Minhas

(57) ABSTRACT

An analysis and visualization depicts how an application is leveraging processor cores of a distributed computing system, such as a computer cluster, in time. The analysis and visualization enables a developer to readily identify the degree of concurrency exploited by an application at runtime and the amount of overhead used by libraries or middleware. Information regarding processes or threads running on the nodes over time is received, analyzed, and presented to indicate portions of computer cluster that are used by the application, idle, other processes, and libraries in the system. The analysis and visualization can help a developer understand or confirm contention for or under-utilization of system resources for the application and libraries.

20 Claims, 5 Drawing Sheets

(56) References Cited

U.S. PATENT DOCUMENTS

| | | | |
|---|---|---|---|
| 2007/0220513 A1 | 9/2007 | Hwang | |
| 2007/0250820 A1 | 10/2007 | Edwards et al. | |
| 2007/0294693 A1 | 12/2007 | Barham | |
| 2008/0098207 A1 | 4/2008 | Reid et al. | |
| 2008/0189488 A1 | 8/2008 | DeWitt et al. | |
| 2009/0063885 A1* | 3/2009 | Arimilli et al. | 713/375 |
| 2009/0089790 A1* | 4/2009 | Manczak et al. | 718/104 |
| 2009/0237404 A1 | 9/2009 | Cannon, III | |
| 2009/0313633 A1 | 12/2009 | Nardelli et al. | |
| 2009/0319996 A1 | 12/2009 | Shafi et al. | |
| 2010/0223600 A1 | 9/2010 | Shafi et al. | |
| 2011/0099550 A1 | 4/2011 | Shafi | |
| 2011/0099554 A1 | 4/2011 | Shafi | |

OTHER PUBLICATIONS

Aron, et al., "Cluster Reserves: A Mechanism for Resource Management in Cluster-based Network Servers", Retrieved at << http://citeseerx.ist.psu.edu/viewdoc/download?doi=10.1.1.92.917&rep=rep1&type=pdf >>, Proceedings of the ACM Sigmetrics 2000 International Conference on Measurement and Modeling of the Computer Systems, Jun. 2000, pp. 12.

Medernach, Emmanuel, "Workload analysis of a cluster in a Grid environment", Retrieved at << http://arxiv.org/PS_cache/physics/pdf/0506/0506176v1.pdf >>, Feb. 2, 2008, pp. 1-19.

"Visual Studio 2010 Beta 1: Parallel Performance Tools Overview", retrieved at <<http://blogs.msdn.com/hshafi/archive/2009/05/18/visual-studio-2010-beta-1-parallel-performance-tools.aspx>>, May 18, 2009, pp. 5.

Graham, Bill, "Software Visualization Tools to Optimize Multi-core Systems", <<http://www.embedded-control-europe.com/c_ece_knowhow/874/ECEfeb07p21.pdf>>, Feb. 2007, pp. 3.

"Taking Parallelism Mainstream", retrieved at <<http://download.microsoft.com/download/D/5/9/D597F62A-0BEE-4CE7-965B-099D705CFAEE/Taking%20Parallelism%20Mainstream%20Microsoft%20February%202009.docx>>, Oct. 9, 2008, pp. 21.

Health, et al., "ParaGraph: A Tool for Visualizing Performance of Parallel Programs", retrieved at <<http://www.netlib.org/paragraph/manual.ps.>>, Sep. 1, 1994, pp. 50.

Graham, et al., "Evaluation of a Prototype Visualization for Distributed Simulations", retrieved at <<http://www.informs-sim.org/wsc98papers/200.PDF, Proceedings of the 1998 Winter Simulation Conference, 1998, pp. 9.

Godin, et al., "Parallel Performance Visualization Using Moments of Utilization Data", retrieved at <<http://ipdps.cc.gatech.edu/1998/papers/198.pdf>>, Jun. 22, 2000, pp. 1-6.

"Parallel Performance Analysis, Visualization and Optimization" retrieved at <<http://charm.cs.uiuc.edu/research/parallel_perf/>>, Sep. 18, 2009, pp. 4.

The Office Action for U.S. Appl. No. 12/605,932 mailed May 22, 2012 (12 pages).

Waddington, et al., "Dynamic Analysis and Profiling of Multi-threaded Systems," 32 pgs., (Jan. 14, 2007).

The Office Action for U.S. Appl. No. 12/605,932 mailed Feb. 1, 2013 (9 pages).

"Visual Studio 2010 CTP Walkthroughs," 316 pgs., (Sep. 2008).

The Final Office Action for U.S. Appl. No. 12/605,932 mailed Aug. 8, 2013 (9 pages).

The Office Action for U.S. Appl. No. 12/605,932 mailed Mar. 27, 2014 (11 pgs.).

The Final Office Action for U.S. Appl. No. 12/605,932 mailed Sep. 18, 2014 (11 pgs.).

"IBM Toolkit for Data Collection and Visual Analysis for Multi-Core Systems" , Retrieved at <<http://www.alphaworks.ibm.com/tech/dcva4j>> Oct. 2, 2008, pp. 1-2.

Matassa, et al.,"Best Practices: Adoption of Symmetric Multiprocessing Using VxWorks and Intel Multi-Core Processors", Retrieved at <<http://download.intel.com/technology/advanced_comm/321307.pdf>> Feb. 2009, pp. 1-20.

Ma, et al., "Delta Execution: A Preemptive Java Thread Migration Mechanism", Retrieved at <<http://i.cs.hku.hk/~fcmlau/papers/cluster00.pdf>> 2000,vol. 3, Issue 2, pp. 83-94.

"Visualization Tools Aid Multi-Core Development", Retrieved at http://www.embeddedtechmag.com/content/view/109/122/1/2/ >>Jun. 5, 2007, pp. 1-2.

Shafi, Hazim, "Performance Pattern 2: Disk I/O", Retrieved at <<http://blogs.msdn.com/hshafi/>> Sep. 22, 2009, pp. 1-18.

The Office Action for U.S. Appl. No. 12/605,947 mailed May 21, 2012 (10 pgs.).

The Office Action for U.S. Appl. No. 12/605,947 mailed Nov. 30, 2012 (8 pgs.).

The Final Office Action for U.S. Appl. No. 12/605,947 mailed Aug. 8, 2013 (7 pgs.).

The Office Action for U.S. Appl. No. 12/605,947 mailed Mar. 7, 2014 (9 pgs.).

The Final Office Action for U.S. Appl. No. 12/605,947 mailed Sep. 4, 2014 (9 pgs.).

"ThreadX", retrieved at <<http://rtos.com/page/product.php?id=2 >>, pp. 6.

"Graphical Thread Dumps", retrieved at <<http://neuroning.com/articles/2005/11/24/graphical-thread-dumps>>, Nov. 25, 2005, pp. 3.

The Office Action for U.S. Appl. No. 12/394,445 mailed Jan. 20, 2012 (12 pgs.).

The Final Office Action for U.S. Appl. No. 12/394,445 mailed Jul. 13, 2012 (12 pgs.).

The Notice of Allowance for U.S. Appl. No. 12/394,445 mailed Nov. 27, 2012 (11 pgs.).

* cited by examiner

ANALYSIS AND VISUALIZATION OF CLUSTER RESOURCE UTILIZATION

This application is related to U.S. patent Ser. No. 12/605,932 filed on Oct. 26, 2009.

BACKGROUND

A distributed computer system includes multiple autonomous computers, each referred to as a node, that communicate with each other through a computer network. The computers interact with each other in order to achieve a common goal, and a problem is divided into many tasks, which are distributed across the nodes of the computer system. Often, the distributed computer system is able to concurrently process several computations and to run parallel computer applications on its nodes. A computer cluster is a form of such a distributed computer system.

A computer cluster is a group of linked computers working together so that they can appear as a single computer. The computer cluster can be deployed to improve one or more features of performance, reliability, or availability than a single computer in the cluster, and computer clusters are often more cost effective than single computers of similar speed and performance. Often, a computer cluster includes a group of identical or similar computers tightly connected to each other through a fast local area network. One category of such a computer cluster is a Beowulf Cluster, which is typically used for high performance parallel computing.

Parallel, or concurrent, computer applications include concurrent tasks that can be executed on distributed computer systems such as a Beowulf Cluster. Concurrent applications provide increased performance to solve complex problems over sequential applications, but parallel programming also presents great challenges to developers. Parallel applications are written to include concurrent tasks distributed over the computers or nodes. To write effective parallel code, a developer often identifies opportunities for the expression of parallelism and then maps the execution of the code to the multiple node hardware. These tasks can be time consuming, difficult, and error-prone because there are so many independent factors to track. Understanding the behavior of parallel applications and their interactions with other processes that are sharing the processing resources or libraries of a distributed computer system is a challenge with the current developer tools.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to an analysis and visualization of how an application is leveraging nodes in a distributed computer system. With the analysis and visualization, a developer can readily identify the degree of concurrency, or parallelism, exploited by an application at runtime, how it varies with time, and how other processes or libraries in the system interfere with it by contending for the nodes. An example of the disclosure receives information regarding processes, or tasks running, and libraries on the nodes over time. The information is analyzed and presented to indicate portions of the computer system that are used by the application, idle, used by other processes, or used by libraries or other middleware in the system to help a developer understand contention for nodes and how it varies with time. The analysis and visualization can be implemented as a method, a software product, or as a system.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
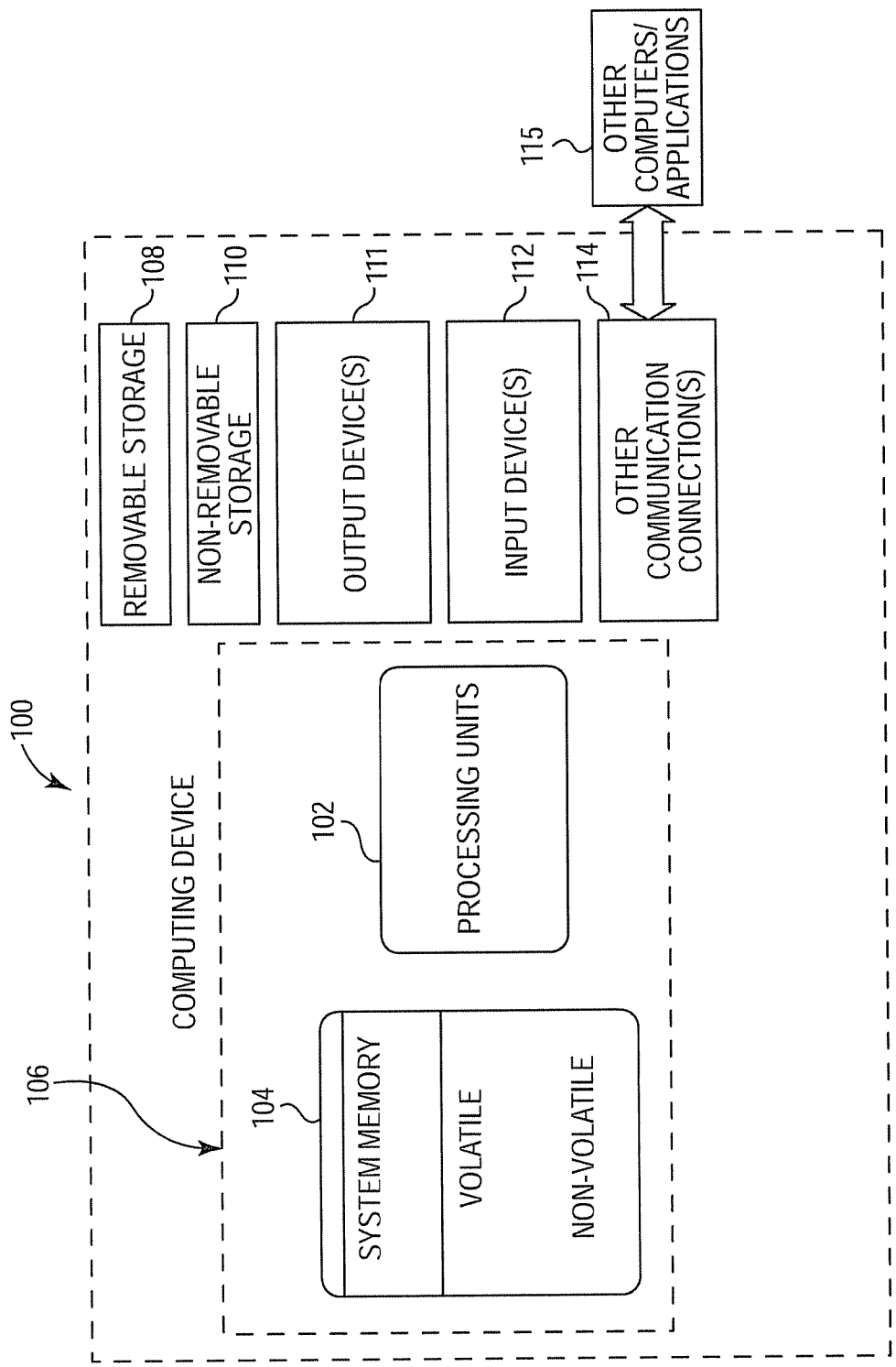
FIG. 1 is a block diagram illustrating an example computing device.

FIG. 1 illustrates an exemplary computer system that can be employed as an operating environment for a developer tool for analyzing and visualizing resource utilization of a distributed system, or the computer system can be included as an example of a computing device in a distributed computer system. The exemplary computer system includes a computing device, such as computing device 100. In a basic configuration, computing device 100 typically includes a processor architecture having one or more processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. An example communication connection can be an Ethernet interface. In some examples, the computing device can also have one or more additional processors or specialized processors (not shown) to perform processing functions offloaded from the processor 102. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment.

A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a unique thread identifier, and a thread context (or thread state) until the thread is terminated. A thread context includes the thread's set of machine registers, the kernel stack, a thread environmental block, and a user stack in the address space of the process owning the thread. In parallel applications, threads can be concurrently executed on the processor 102.

Figure 2:
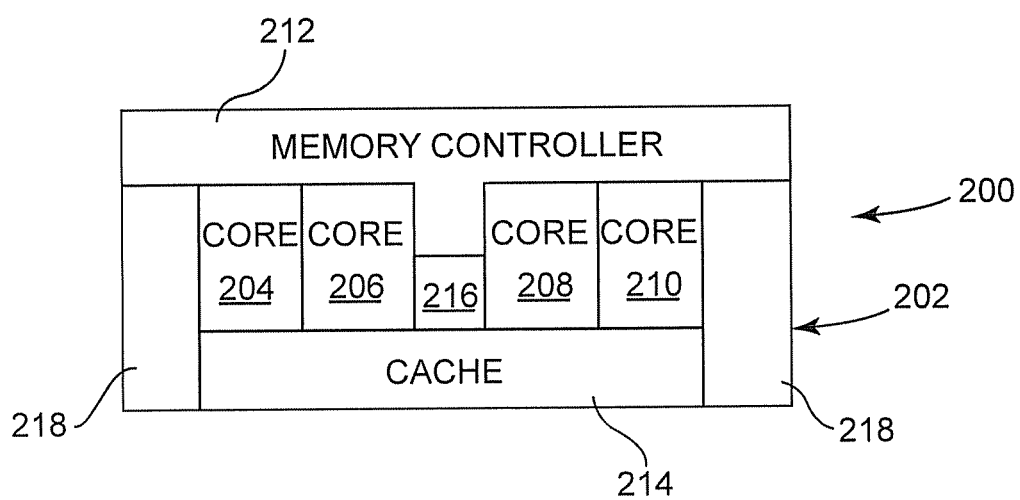
FIG. 2 is a schematic diagram illustrating an example of a multiple core processing system of the computing device of FIG. 1.

FIG. 2 illustrates an example multiple core processor 200 that can be implemented in the computing device 100 as processor 102 to concurrently execute threads within the computing device 100. This example includes multiple cores implemented on a single die 202. Other examples are contemplated where the processor 102 exists on separate chips or other configurations. The example of FIG. 2 includes four physical processor cores 204, 206, 208, 210, or simply four physical cores, where each of the physical cores is available to process at least one application thread concurrently with at least one other physical core processing another thread. The physical cores 204, 206, 208, 210, are adjacent to a memory controller 212 and a cache 214 on the die 202 as shown. An example of the cache can include a shared level-three cache and multiple other caches such as level-two and level-one caches that are implemented within processor cores 204, 206, 208, and 210. In the example die 202, an on-die queue 216 is disposed between the on-die memory controller 212 and the on-die cache 214. The illustrated configuration is representative of a chip including processors currently available under the designation "Nehalem" manufactured by Intel Corp. of Santa Clara, Calif. The die 202 can include other features 218 or combination of features such as memory interfaces, miscellaneous input/output blocks, proprietary interconnects, expansion card interfaces, and the like.

In the example, each physical core is capable of efficiently and concurrently executing multiple threads of a concurrent process. Such physical cores are often referred to as "Simultaneous Multi-Threading," or often simply "SMT," cores, and the concurrently executed threads on each physical core share hardware resources included within the single physical core. In the example of the multiple core processing system 200, each physical core is capable of multithreading. Multithreading technology aims to increase core efficiency through thread-level and instruction-level parallelism. Each physical core capable of multithreading, or the like, can present the operating system with as many logical cores as concurrently executing threads it supports. In the example multiple core processing system 200, each physical core 204, 206, 208, 210 is capable of concurrently executing two threads, and thus provides the operating system with eight concurrent logical cores.

Additionally, the computing device 100 can include specialized processors, such as one or more graphics processing units, which can be adapted to process concurrent threads in addition to the threads on the processor 102. Some graphic processing units include at least forty-eight logical cores, which can be used for other processes than graphics rendering. The computing device 100 can theoretically execute as many concurrent threads as there are logical cores in the device 100.

Figure 3:
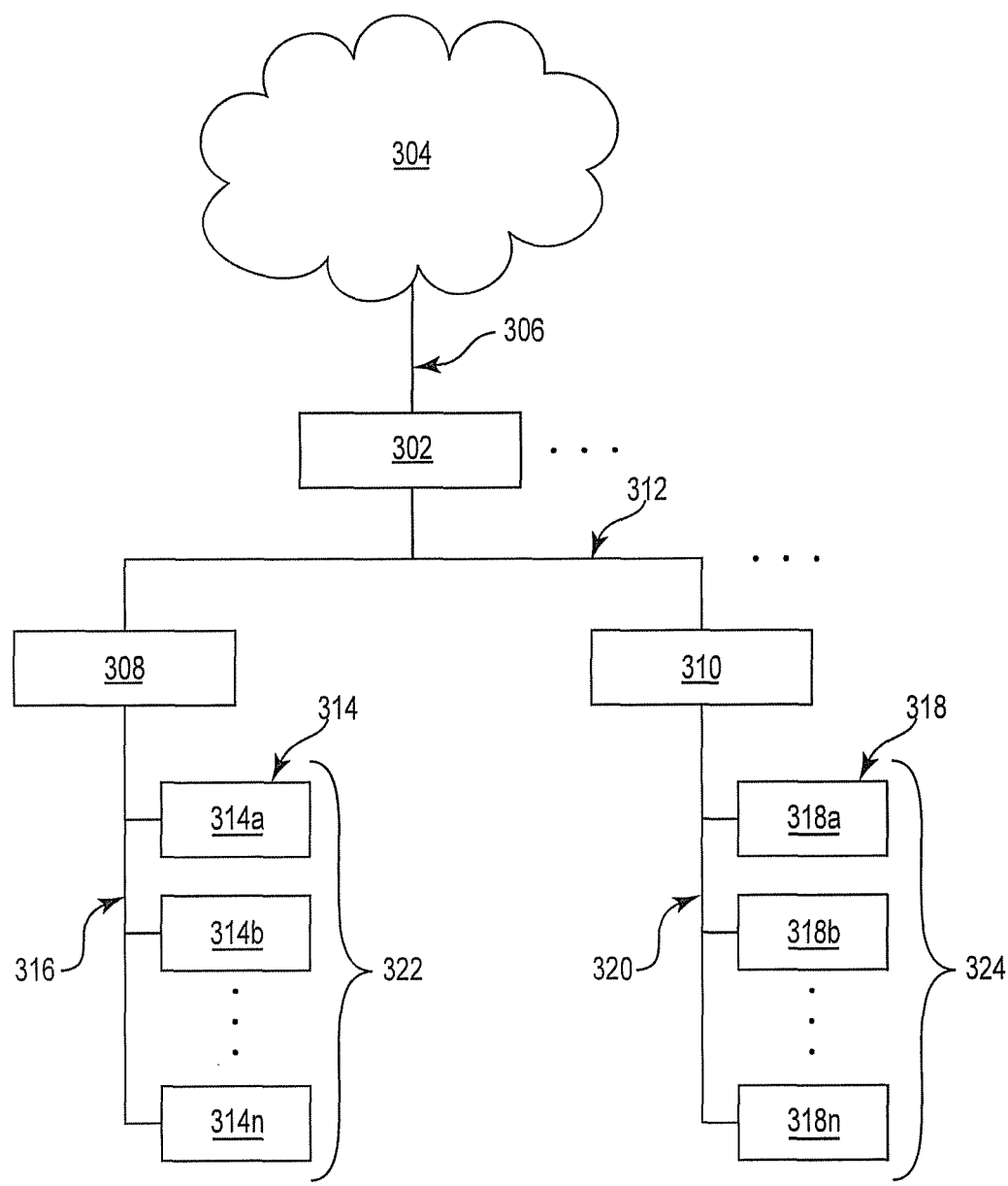
FIG. 3 is a schematic diagram illustrating an example distributed computer system employing a plurality of computing devices such as the computing device illustrated in FIG. 1.

FIG. 3 illustrates an example architecture and networking of a distributed computer system 300, such as a Beowulf Cluster. The system 300 can be networked into a TCP/IP LAN (Transmission Control Protocol/Internet Protocol Local Area Network). The system 300 includes an I/O (input/output) node, or queen node, 302 coupled to a network such as the Internet 304 over a suitable network connection 306. In one example, the I/O node 302 can be a commercially available computing device or computer server, like computing device 100. The I/O node 302 in the example is also connected to a network switch or to a plurality of network switches, such as Ethernet switches 308, 310, through a gigabit network connection 312. Each Ethernet switch 308, 310, is coupled to a plurality of compute nodes. In the example, Ethernet switch 308 is coupled to compute nodes 314 (314a, 314b, . . . , 314n) over a fast Ethernet connection 316. Ethernet switch 310 is coupled to compute nodes 318 (318a, 318b, . . . , 318n) over fast Ethernet connection 320. The compute nodes, in the example, are generally homogenous, commercially available computing devices, such as computing device 100. Ethernet switches 308 and 310 and their respective compute nodes 314, 318 can be considered as sub-clusters 322 and 324, respectively, as illustrated. Each Ethernet switch 308, 310 can include one or more gigabit ports and many fast Ethernet ports.

The system 300 can include additional features. For example, the system 300 can include a plurality of I/O nodes directly coupled to the Internet and directly coupled to the gigabit network connection 312. The I/O node 302, or a plurality of I/O nodes, can be coupled to a storage system such as a RAID (Redundant Array of Inexpensive Disks) system. Also, each of the plurality of I/O nodes can be logically coupled to an assigned sub-cluster. The use of multiple sub-clusters and I/O nodes can be to segregate network traffic resulting in non-local file I/O operations and to spread data storage so each I/O node can avoid processing single large files. Still further, while the term "node" often is synonymous with computing device 100, examples are contemplated where a single computing device 100 can include multiple nodes, where each such node refers to a separate processing system within the computing device 100.

Although there is no particular software configuration that defines the system of 300, many such computer clusters run an operating system such as a form of the operating system available under the trade designation Windows from Microsoft, Inc., of Redmond, Wash., and can also run runtime libraries, which can be a form of middleware. The system 300 includes computer programs and libraries installed that allow processing to be shared among the nodes. Several runtime libraries are available, but commonly used parallel processing libraries include Message Passing Interface (MPI) and Parallel Virtual Machine (PVM), which allow the nodes to communicate with each other. PVM is often compared to MPI, and so some or all of the below described high-level features of MPI can apply to other libraries as well.

MPI is a language-independent communications protocol used to program parallel computers. Both point-to-point and collective communication are supported. MPI is a message-passing application programmer interface, together with protocol and semantic specifications for how its features can behave in any implementation. Most MPI implementations consist of a specific set of routines—i.e., an application programmer interface or API—directly callable from programming languages such as Fortran, C, and C++ and from any programming language capable of interfacing with such libraries such as C# (C-sharp), Java, or Python. The MPI implementation language is not constrained to match the programming language or languages it seeks to support at runtime.

MPI library functions include point-to-point rendezvous-type send/receive operations, choosing between logical process topologies, exchanging data between process pairs such as send/receive operations, combining partial results of computations to gather and reduce operations, synchronizing nodes (barrier operation) as well as obtaining network-related information such as the number of processes in the computing session, current processor identity that a process is mapped to, neighboring processes accessible in a logical topology, and the like. Point-to-point operations can come in one or more of synchronous, asynchronous, buffered, and ready forms, to allow both relatively stronger and weaker semantics for the synchronization aspects of a rendezvous-send.

The MPI interface can provide essential virtual topology, synchronization, and communication functionality between a set of processes that have been mapped to nodes/servers/computer instances in a language-independent way, with language-specific syntax (bindings), plus a few language-specific features. MPI programs often work with processes. Typically, for high performance, each core in a node is assigned a single process. Nodes having multiple processors 102 can be assigned multiple processes. Alternatively, hybrid programming models such as OpenMP and MPI may be used to efficiently utilize the multiple processors on a single node.

Developing applications for computer clusters or other forms of distributed computing can be challenging. Without adequate information on how a concurrent application utilizes resources in the system 300, the concurrent application can suffer from significant inefficiencies that could be difficult to address. Additionally, developers can gain valuable insight into concurrent applications if they are able to determine how resource utilization varies over time. A developer can get further insight into how the resources are shared by other applications that are concurrently running on the system 300. By understanding how resource utilization varies in time, the developer can quickly identify phases of executions that exhibit undesirable behavior in order to concentrate tuning or debugging efforts accordingly. Additional examples are contemplated.

Performance in computer clusters or other forms of distributed systems is also affected by the runtime libraries. For example, the MPI runtime library has I/O functions such as MPI_Send( ) for sending and MPI_Recv( ) for receiving. Time spent executing these communication functions, or other library functions, is often considered overhead, i.e., not doing useful work of the application. Developers can get further insight into the concurrent application if they can understand the times spent on executing library functions.

Figure 4:
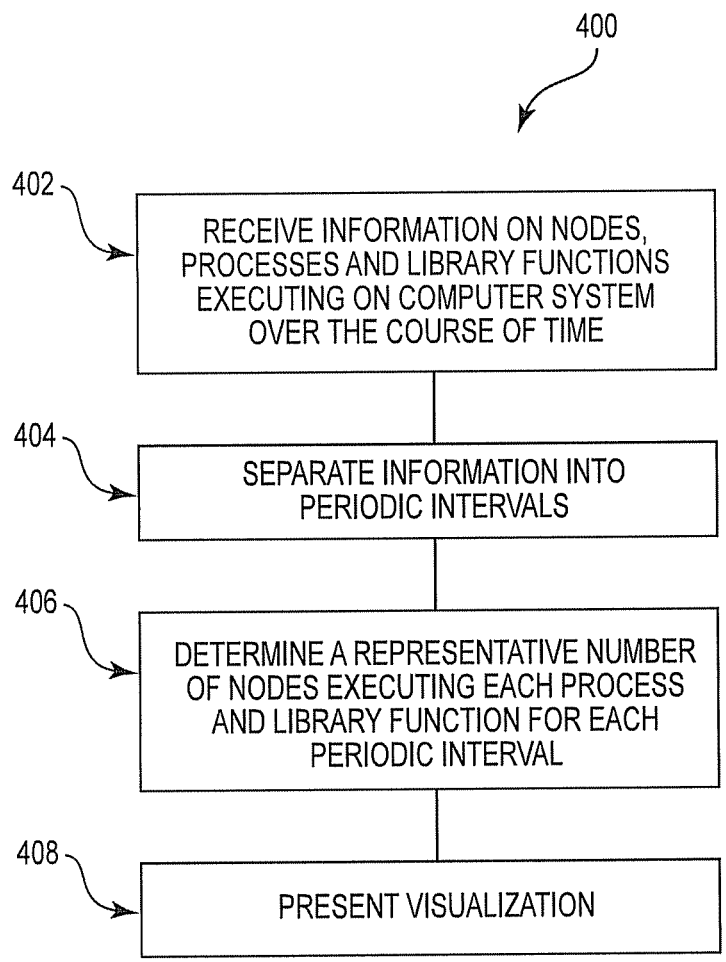
FIG. 4 is a block diagram illustrating an example method, which can be implemented on the computing device of FIG. 1, for analyzing and visualizing the distributed computer system of FIG. 3.

FIG. 4 illustrates an example method 400 of determining use of distributed nodes in a concurrent process vis-à-vis other running processes and middleware on the distributed computer system 300 over the course of time. Information regarding the number of available nodes as well as information regarding threads and the processes which they belong to executing on the nodes are received into the method at 402. In one example, the operating system interrogates the hardware to determine the number of nodes available in the distributed computer system 300. Also in 402, information on threads or processes of an application of interest (such as the application being profiled or examined), information on the idle process, information on the system process or other processes, and information on the use of library functions or other node overheads, is received. This information gathered over the course of time can be separated into periodic intervals at 404. These periodic intervals can include equal periods of time or another measurement. For each interval, a representative number of executing nodes is determined for each received process or library function at 406. For example, the representative number could be an average number of nodes executing at once over the interval for each process, but other representative numbers are possible. The representative number of nodes for each process or library over the course of the period is presented to the developer as a visualization at 408. In one example, this visualization can include a graph. The method 400 can gather information from all of the nodes to generate a cluster-wide version of the visualization.

Method 400 can be implemented as a tool to be run on the computing device 100, such as during the debugging or profiling of the concurrent application. In one example, the tool is a software program or part of a software package. The software program can be included in a computer readable storage medium storing computer executable instructions for controlling a computing device, such as computing device 100, to perform the method 400. In one example, the tool can be a part of an integrated development environment, or IDE. The IDE can include a code editor, a compiler, build tools, a debugger, a profiler, and other tools for developing and testing an application. An example of an IDE is available under the trade designation "Visual Studio" from Microsoft. The software program can also be a separate product that can be used with one or more IDE packages or as a stand-alone product.

Information regarding the number of cores available in a system and the number of cores available for the application, or process, of interest can be determined by one or more system schedulers. For example, information on the number of cores available for the application at 402 can be determined from the cluster management and application launch system, such as from querying a system scheduler such as a cluster scheduler. Further, the operating system scheduler can reveal how many cores are included in the system 300 and, of those cores, how many are available for use with the concurrent application or allocated by the system 300 for the concurrent application. For example, a system 300 can include a thousand nodes, but only one hundred nodes are available or allocated for the concurrent application of interest. This information can be stored in the memory 104 of the computing device 100 operating the developer tool. In one example, the operating system can be instrumented to include these features of querying or interrogating the hardware.

Information regarding the number of threads or processes executing on the nodes can be determined through analyzing event providers such as context switches for the applications on the system 300 and runtime providers for the libraries of the system 300 in one example of 402. In one example, event providers are enabled on each machine in the computer cluster or on every node.

A context switch is a process of storing and restoring the state (context) of the processor 200 such that multiple processes or threads can share a single resource or operate concurrently. The context switch can be included as a feature of a multitasking operating system operating on the system 300. For example, the context switch can be instrumented into the operating system, either manually or automatically, by a developer or the operating system comes provided with this feature. For example, the software tool can interrogate the system scheduler feature of the operating system. A context switch can include a register context switch, a task context switch, a thread context switch, or a process context switch and is determined with the processor and the operating system. In the present example, a thread context switch is used.

Similarly, information regarding the operation of the libraries executing on the nodes can be determined through analyzing runtime providers. Runtime providers emit an event upon entry and upon exit of library functions. Runtime provider events can include the function, a timestamp, and a thread identifier. In one example, runtime providers are instrumented into all library functions or can be instrumented into just those library functions of interest to the developer. The runtime providers can be instrumented into the library or middleware either manually or automatically, or the library may include library functions with pre-instrumented event provider features.

One or more high-speed tracing facilities can be used to generate the event providers. In one example, tracing is provided by the operating system running and the libraries on the system 300, although other methods of receiving event providers are possible. In the present example, a trace can be enabled for a selected or determined duration of time as part of 402. Each event provider can be recorded as an event provider record. Each context switch event can be recorded as a context switch record and every runtime provider can be recorded as a runtime provider record. One example of an analogous form of a tracing mechanism is designated as "Event Tracing for Windows," or "ETW," which is included in many operating systems available from Microsoft. A similar instrumentation can be included for each of the event providers.

In one example, each event provider record includes a timestamp, process identifier, and thread identifier. Additional information, such as a thread identifier for both the thread that is being removed and the thread that is being scheduled for context switches, among other information, can be collected in the event provider records. The event provider record can be analyzed to determine information regarding the process of interest, the idle process, the system process, overhead, and any other processes running during the execution of the process of interest. The event provider can be analyzed to determine information regarding concurrently executing processes, information associating tasks to the concurrently executing processes, and overhead. The analysis can determine a list of threads executing within each process. Also, the analysis can determine the start and stop times of the threads throughout the duration of the trace as well as the number of concurrent nodes executing at any given time during the duration of the trace. In an example where operating system scheduling is performed on threads, the context switch information can be analyzed to list the threads belonging to a given process.

In one example, the time stamps of event providers of each machine in the computer cluster are synchronized. The machines in a typical computer cluster are not necessarily synchronized together, and are often not synchronized. In order to compare event providers from one machine with event providers from another machine occurring at the same time, the time stamps of many of the event provider records are modified with the developer tool to indicate a synchronized time. In one example, the machine clocks are interrogated and resulting information is stored. An algorithm is used to modify the clock information in the developer tool in order to synchronize the occurrence of each event provider record such that the temporal order of events across all nodes in the cluster is accurately reflected.

The information obtained from the event provider records is analyzed and processed into selected intervals over the duration of the trace at 404. Event providers can occur at a high frequency in time, and providing an instantaneous visualization of node use is often noisy or difficult to read. In one example, the information gathered during the duration of a selected portion of the trace (such as the entire trace or a portion less than the entire trace) can be separated into periodic intervals, such as equal intervals of time, sections of code, or some other periodic intervals occurring over the course of time. The other processes and libraries running during the execution of the process of interest can also be separated into the same periodic intervals. A representative number of executing nodes corresponding with nodes is determined for the periodic interval. In a first example, the representative number includes the average number of executing nodes for each process over the course of the periodic interval. Examples of the representative number can include the mean, median, mode, standard deviation, peak, or some other representative number of the number of executing nodes over the course of the logical interval. In one example, the amount of cores used to execute library functions is computed as a fraction of the number of cores used to execute the process of interest. In other words, the average number of cores utilized by the process of interest can be determined, and out of that number, the fraction used to execute library functions or other code can be determined.

In one particular example, the method at 406 analyzes the event providers in the trace for the process of interest, the idle process, the system process (other processes could also be supported), and library functions. Through examining the event providers, the method determines all time intervals during which one or more nodes from a given process were running. The duration of the trace is divided into equal sized periodic intervals, such as one-thousand periodic intervals of equal time over the duration of the trace. For each of these intervals, the method determines the average number of nodes cores collected over utilized nodes, or over the entire cluster, that were executing at the time. The average number can be a non-integer because the operating system can perform provider events at a fine granularity in time. The method generates an area graph that displays this average number of cores executing for the process being analyzed, the idle process, and the system process, and the library functions. Because the method has determined the total number of nodes in the system, the remaining utilization is attributed to the other processes running on the system.

An aspect of runtime library functions is that they can execute some code for a period of time and then block (at least once), which causes a context switch; when the thread is resumed (unblocked), the library function resumes and eventually terminates. The following sequence of event providers for the thread in time can appear as ContextSwitch IN [1], MPI_Recv( ) BEGIN, ContextSwtich OUT, ContextSwitchIN [2], MPI_Recv( ) END. The time period between MPI_Recv( ) BEGIN, ContextSwtich OUT is attributed to the runtime library and not to the application using the node. The time period between ContextSwtich OUT, ContextSwitchIN [2] is considered as blocking time where the node is not used by the process of interest and other processes or the idle process may be scheduled to run by the operating. The time period between ContextSwitchIN [2], MPI_Recv( ) END also is attributed to the runtime library and not to the application using the node.

Figure 5:
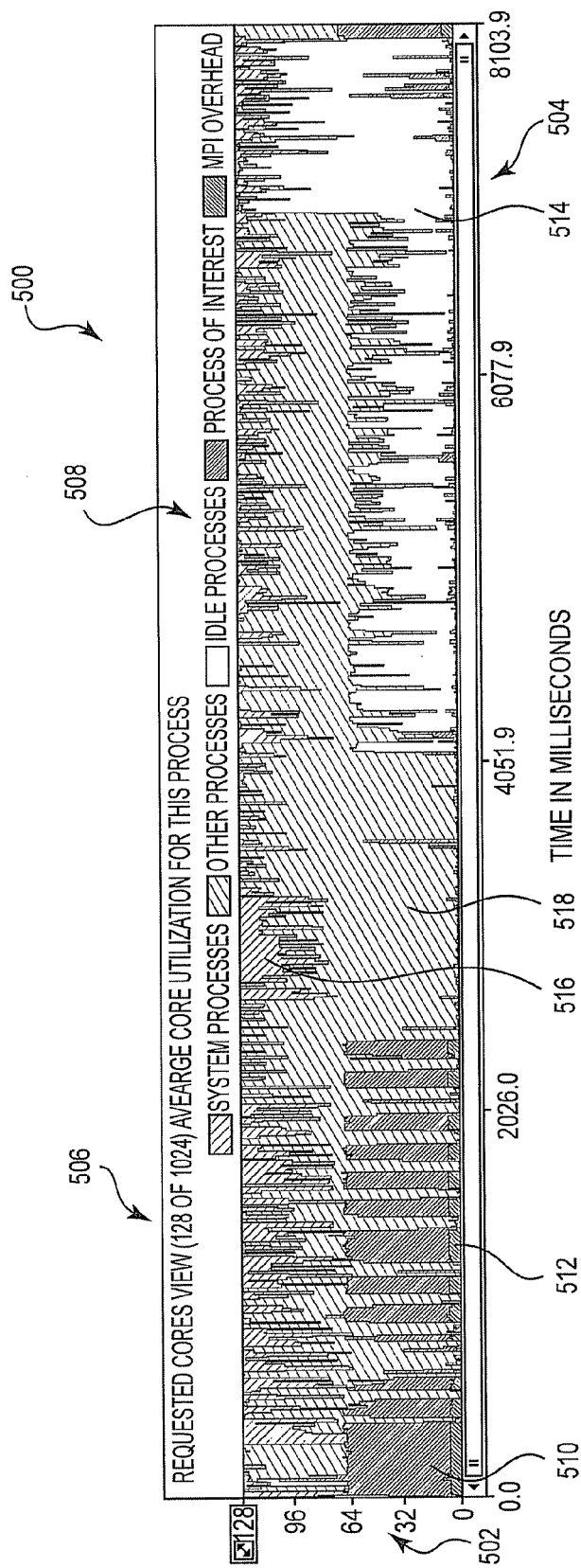
FIG. 5 is a graph illustrating an example output of the method of FIG. 4.

FIG. 5 illustrates an example area graph 500 that can be used to present the number of cores against the duration of the trace in the example above. Area graph 500 includes an axis 502 for the number of cores in the processors 102 on the cluster nodes, which can indicate the total number of cores in the cluster or the number of cores that were allocated for the process of interest by the cluster scheduler. Area graph 500 also includes an axis for time 504 over the duration of the trace, which (for example) can be expressed in milliseconds. In some examples, the graph can indicate an amount of core utilization 506 and whether the axis 502 reflects the total cores on the nodes on which the application was running or the number of actual cores allocated to the process, a legend 508, or other information that can be of help to the user. In this example, the number of cores used by the process of interest over the course of the trace is represented with area 510. The number of cores used by a runtime library over the course of the trace is represented with area 512. The number of idle cores over the course of the trace is represented with area 514. The number of cores used by the system process over the course of the trace is represented with area 516. Thus the remaining number of cores over the course of the trace is attributed to the other processes and represented with area 518. Other graphs can be presented either alongside the area graph 500 or instead of it. One such graph (not shown) can indicate the number of graphical processors used for general purpose computing as a function of time, and so on.

Additional features can be included with the visualization to allow the developer to gain a more detailed understanding of identified issues and to correct them. For example, regions of the graph can be magnified or provided with more resolution and additional details. Analysis and visualization can be limited to specific regions of code. Also, the visualization can be linked with application code such that issues identified on the graph can be readily addressed with modifications to the code. Some or all of these additional features, as well as others, can be included in the method or tool, or can be included with an IDE and integrated into the method.

Review of the area graph 500 can help a developer understand contention for processor resources and how it varies with time. The developer can obtain meaningful insight on opportunities to express additional parallelism and information on how nodes are utilized. The developer can also confirm a desired degree of parallelism in at least a portion of code. Further, the developer can also determine areas of interference with or contention for nodes from other processes or libraries running on the nodes. Dips in utilization can indicate that the developer may want to further investigate this region of code. In one particular example, the visualization can be configured to identify input and output function of libraries in an application that uses many instances of disk I/O, such as occurring in nodes 314, 318. In another example, the visualization can be configured to identify network I/O, such as occurring in node 302. The method can provide an understanding of the behavior of parallel applications and their interactions with other processes that are sharing the processing resources of a computing device, which can thus be used to improve the performance of a parallel program.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method, comprising:
receiving a representative number of at least an amount of available cores in nodes of a distributed computing system;
receiving a plurality of event provider records including context switch records and runtime provider records, wherein context switch records are analyzed to determine a representative number of the cores used to perform at least one selected process over a course of time, and wherein the runtime provider records are analyzed to determine a representative number of the cores used to perform at least one library function that provides for processing the at least one selected process in the nodes over the course of time;
determining from the context switch records and the runtime provider records a duration of time each core of available cores performs the at least one selected process and the at least one selected library function over the course of time;
separating the course of time into periodic intervals;
determining a representative number of cores executing the selected process and library function for each of the periodic intervals on each node in the system; and
presenting the representative number of cores executing the selected process and library function for each of the periodic intervals against the representative number of at least the amount of available nodes over the course of time.

2. The method of claim 1 wherein receiving a representative number of at least the amount of available cores includes querying a system scheduler.

3. The method of claim 2 where the amount of available cores includes less than a number of total cores in the distributed computing system.

4. The method of claim 1 wherein the distributed computer system is a Beowulf Cluster.

5. The method of claim 1 wherein computing devices in the distributed computer system include more than one node.

6. The method of claim 1 wherein library functions are Message Passing Interface (MPI) functions.

7. The method of claim 1 wherein the context switch records include context switch events and the runtime provider records include runtime provider events.

8. The method of claim 7 wherein the context switch events are representative of threads executing in the selected process and the runtime provider events are representative of threads executing the at least one library function.

9. The method of claim 1 wherein the representative number of cores includes the average number of concurrently executing threads in the selected process over the course of the periodic interval and are combined to provide a representative number of nodes executing the selected process over the course of the periodic interval.

10. The method of claim 1 where in the at least one selected processes includes a process of interest, an idle process, and a system process.

11. The method of claim 1 and further comprising modifying clock information for at least some of the nodes in the distributed computing system to synchronize the occurrence of each event provider record across the nodes in the cluster.

12. The method of claim 1 wherein the representative number of cores for each of the periodic intervals against the representative number of at least the amount of available cores in the distributed computing system over the course of time is presented in an area graph.

13. The method of claim 1 and further including instrumenting runtime providers into library functions of interest.

14. A computer readable storage device storing computer executable instructions for controlling a computing device to perform a method comprising:
receiving a representative number of at least the amount of available cores in nodes of a distributed computing system, wherein each node includes at least one core;
receiving a plurality of event provider records including context switch records and runtime provider records, wherein context switch records include a representative number of the cores used to perform at least one selected process over a course of time, and wherein the runtime provider records include a representative number of the cores used to perform at least one library function that provides for processing the at least one selected process in the nodes over the course of time;
determining from the context switch records and the runtime provider records a duration of time each core of available cores performs the at least one selected process and the at least one selected library function over the course of time;
separating the course of time into periodic intervals;
determining a representative number of cores executing the selected process and library function for each of the periodic intervals; and
presenting the representative number of cores executing the selected process and library function for each of the periodic intervals against the representative number of at least the amount of available cores over the course of time.

15. The computer readable storage device of claim 14 wherein the amount of available cores in a distributed computing system are received by interrogating an operating system on the distributed computing system.

16. The computer readable storage device of claim 14 wherein the at least one library function includes one of Message Passing Interface (MPI) functions or Parallel Virtual Machine (PVM) functions.

17. The computer readable device of claim 14 wherein the at least one library function includes Send( ) and Recv( ) functions.

18. The computer readable storage device of claim 14 further including an integrated development environment.

19. A computer readable storage device storing a development tool including computer executable instructions for controlling a computing device, the development tool configured to perform a method comprising:
receiving a representative number of at least the amount of available nodes in a computer cluster computing system;
receiving a plurality of event provider records including context switch records and runtime provider records, wherein context switch records include a representative number of the nodes used to perform at least one selected process over a course of time, and wherein the runtime provider records include a representative number of the nodes used to perform input or output library functions that provides for processing the at least one selected process in the nodes over the course of time;
determining from the context switch records and the runtime provider records a duration of time each core of available cores performs the at least one selected process and the at least one selected library function over the course of time;
modifying clock information for at least some of the nodes in the distributed computing system to synchronize the occurrence of each event provider record;
separating the course of time into generally equal periodic intervals;
determining a representative number of nodes executing the selected process and a representative number of library function for each of the periodic intervals; and
presenting the each of the representative number of nodes executing the selected process and the representative number of library function for each of the periodic intervals against the representative number of at least the amount of available nodes over the course of time in an area graph.

20. The computer readable storage device of claim 19 wherein each node is a logical core of the computer cluster.

* * * * *